United States Patent
Chinta et al.

(10) Patent No.: US 11,795,827 B1
(45) Date of Patent: Oct. 24, 2023

(54) AIRFOIL ASSEMBLY WITH A STRUCTURALLY REINFORCED FOAM CORE

(71) Applicant: General Electric Company, Schenectady, NY (US)

(72) Inventors: Raghuveer Chinta, Bengaluru (IN); Srinivas Nuthi, Bengaluru (IN); Gary Willard Bryant, Jr., Loveland, OH (US); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/712,701

(22) Filed: Apr. 4, 2022

(51) Int. Cl.
*F01D 5/14* (2006.01)

(52) U.S. Cl.
CPC .......... *F01D 5/147* (2013.01); *F05D 2230/10* (2013.01); *F05D 2230/50* (2013.01); *F05D 2250/283* (2013.01); *F05D 2300/612* (2013.01)

(58) Field of Classification Search
CPC . B64C 11/26; B64C 2027/4736; B64C 11/24; F01D 5/282; F01D 5/147; F01D 21/045; F01D 5/141; F01D 5/16; F01D 5/18; F01D 25/00; F01D 25/005; F01D 5/28; F01D 25/06; F01D 5/14; F01D 5/288; F01D 5/34; F01D 9/02; F05D 2300/603; F05D 2220/32; F05D 2230/10; F05D 2300/6034; F05D 2300/612; F05D 2300/702; F05D 2220/36; F05D 2300/6033; F05D 2230/50; F05D 2230/53; F05D 2240/301; F05D 2240/303; F05D 2250/283; F05D 2300/6032; F04D 29/324; F04D 29/023; F04D 29/388; F04D 29/30; F04D 29/663; F04D 29/668; F05B 2240/301; F05B 2280/6012

See application file for complete search history.

(56) References Cited

U.S. PATENT DOCUMENTS

| | | | |
|---|---|---|---|
| 4,648,921 A | 3/1987 | Nutter, Jr. | |
| 5,279,892 A | 1/1994 | Baldwin et al. | |
| 5,634,771 A | 6/1997 | Howard et al. | |
| 8,246,303 B2 | 8/2012 | Thomas et al. | |
| 8,348,621 B2 * | 1/2013 | Lafont | F04D 27/0292 416/239 |
| 9,045,986 B2 * | 6/2015 | Bianchi | B64C 11/26 |
| 9,139,287 B2 | 9/2015 | Folsom et al. | |
| 9,429,024 B2 | 8/2016 | Nagle et al. | |
| 9,488,056 B2 * | 11/2016 | Nagle | B64C 11/26 |
| 9,574,544 B2 | 2/2017 | Tobin et al. | |

(Continued)

FOREIGN PATENT DOCUMENTS

GB     2327925 A     2/1999

*Primary Examiner* — Eric J Zamora Alvarez
(74) *Attorney, Agent, or Firm* — Dority & Manning, P.A.

(57) ABSTRACT

An airfoil assembly comprising a central spar extending along the radial direction; a blade skin positioned around the central spar to define an airfoil that has a pressure side and a suction side extending in the axial direction between a leading edge and a trailing edge, wherein at least one cavity is defined between the blade skin and the central spar; and a support structure positioned at least partially within the at least one cavity. The support structure comprises: a foam; and a foam reinforcement structure embedded within the foam.

19 Claims, 6 Drawing Sheets

(56) References Cited

U.S. PATENT DOCUMENTS

| | | |
|---|---|---|
| 9,611,030 B2 * | 4/2017 | Petiot .................. B64C 7/00 |
| 2013/0136616 A1 | 5/2013 | Prunet |
| 2015/0086379 A1 | 3/2015 | Pentony |

* cited by examiner

AIRFOIL ASSEMBLY WITH A STRUCTURALLY REINFORCED FOAM CORE

FIELD

The present disclosure relates to gas turbine engines, and more particularly, to airfoil assemblies and methods for manufacturing the same.

BACKGROUND

A gas turbine engine typically includes a fan assembly and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. In a turbofan engine, the fan assembly generally includes a fan having a plurality of airfoils or fan blades extending radially outwardly from a central hub and/or a disk. During certain operations, the fan blades provide an airflow into the turbomachine and over the turbomachine to generate thrust.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
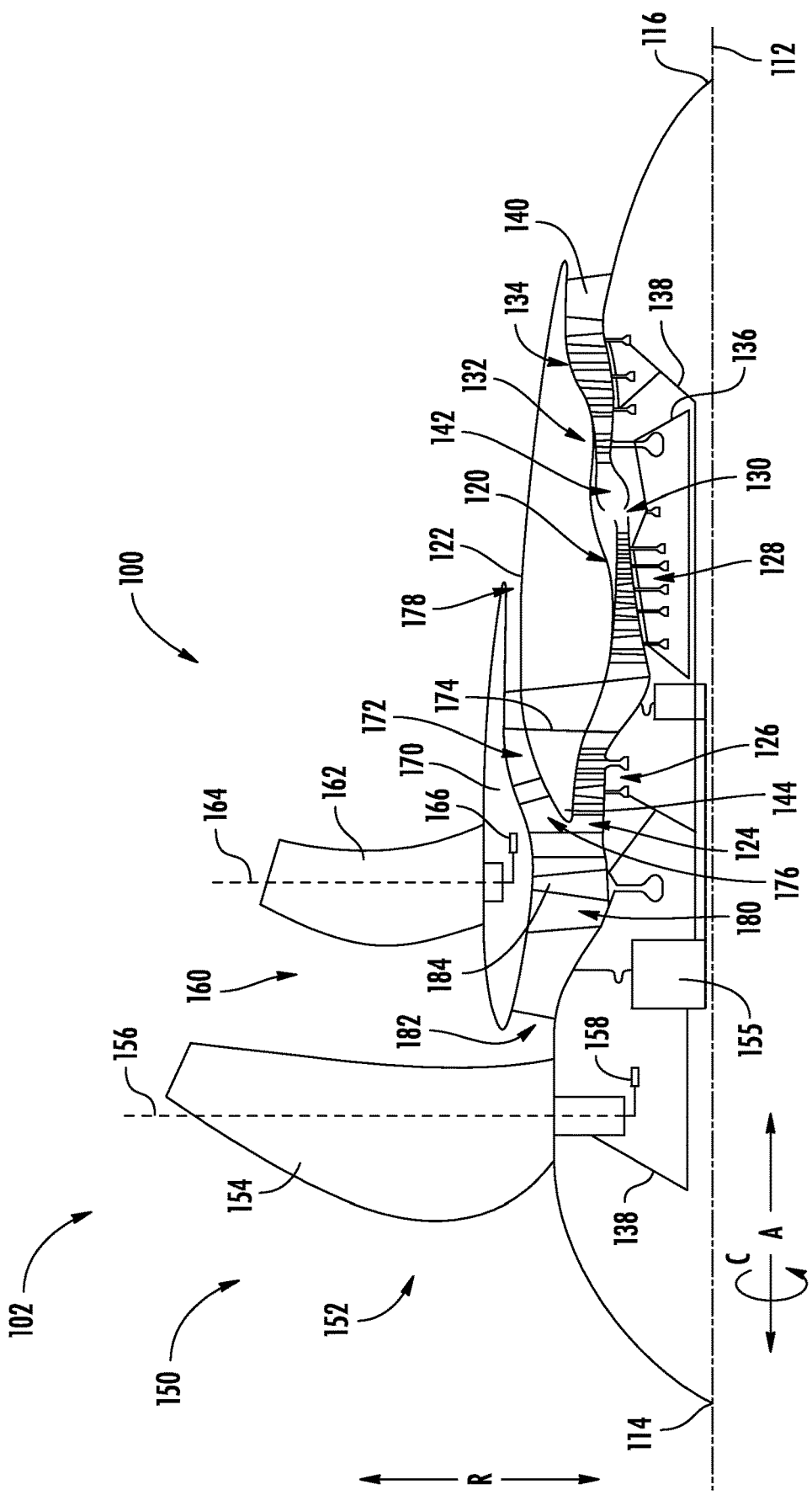
FIG. 1 is a schematic cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "first stream" or "free stream" refers to a stream that flows outside of the engine inlet and over a fan, which is unducted. Furthermore, the first stream is a stream of air that is free stream air. As used herein, the term "second stream" or "core stream" refers to a stream that flows through the engine inlet and the ducted fan and also travels through the core inlet and the core duct. As used herein, the term "third stream" or "mid-fan stream" refers to a stream that flows through an engine inlet and a ducted fan but does not travel through a core inlet and a core duct. Furthermore, the third stream is a stream of air that takes inlet air as opposed to free stream air. The third stream goes through at least one stage of the turbomachine, e.g., the ducted fan.

Thus, a third stream means a non-primary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions. In other exemplary embodiments, it is contemplated that the airflow through the third stream may contribute greater than 50% of the total engine thrust (and at least, e.g., 2% of the total engine thrust) at an engine operating condition. In other exemplary embodiments, it is contemplated that the airflow through the third stream may contribute approximately 50% of the total engine thrust (and at least, e.g., 2% of the total engine thrust) at an engine operating condition.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Certain modern fan blades are formed of composite material(s) to reduce a weight of the fan blades. However, aircraft engine components, such as fan blades, nacelles, guide vanes, etc., used in jet engine applications are susceptible to foreign object impact damage or ingestion events, such as an ice ingestion or bird strike. Moreover, fan blades formed from composite material(s) may be more susceptible to damage in such events, e.g., by blade fracture, component delamination, bending or deformation damage, or other forms of blade damage. Accordingly, improved airfoil designs for addressing one or more of the above-mentioned problems would be useful. More specifically, an airfoil assembly with a lightweight and structurally sound design that can withstand foreign object ingestion events would be particularly beneficial.

As explained herein, composite fan blades that use internal foam support may be used in gas turbine engines. However, the foam may have a high risk of debonding from other portions of the blade. More specifically, under certain operational loads or during an ingestion event (e.g., ice ingestion or bird strike), the foam within a composite blade may shear or otherwise lose its bond with the spar, the outer blade skin, etc. Accordingly, aspects of the present subject matter are generally directed to a structurally reinforced foam positioned within the composite blade, e.g., within a void defined between a spar and an outer blade skin.

According to exemplary embodiments, the foam may be segmented and placed at different regions of the blade to meet the strength and stiffness requirements of the blade. The structural reinforcement may include a frame, grid, cross members, elongated supports, etc. that are formed from chopped fiber polymer matrix composites ("PMCs"), continuous PMCs, glass, sheet metal, etc. The structurally reinforced foam may be co-cured to generate a bond line between the structural spar and blade flowpath skins.

Such a composite blade construction may facilitate improved foam durability, thus enabling fan blade weight reduction while minimizing the potential for blade deformation, debonding, failure, or other operational degradation. In addition, local blade stiffnesses may be modified and tailored by selectively designing and positioning structural reinforcements within the foam. Moreover, such constructions may improve fan blade stability to meet aeromechanical requirements, may result in an improvement in dissipation of shock wave energy due to impact loads, may provided better control of blade untwist behavior to improve the operability margins, may improve fan blade durability, etc.

Referring now to FIG. 1, a schematic cross-sectional view of a gas turbine engine 100 is provided according to an example embodiment of the present disclosure. Particularly, FIG. 1 provides an engine having a rotor assembly with a single stage of unducted rotor blades. In such a manner, the rotor assembly may be referred to herein as an "unducted fan," or the entire gas turbine engine 100 may be referred to as an "unducted engine," or an engine having an open rotor propulsion system 102. In addition, the engine of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan is shown at about the same axial location as the fan blade 154, and radially inward of the fan blade 154. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath or fan duct 172. The fan flowpath or fan duct 172 may be referred to as a third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 2:
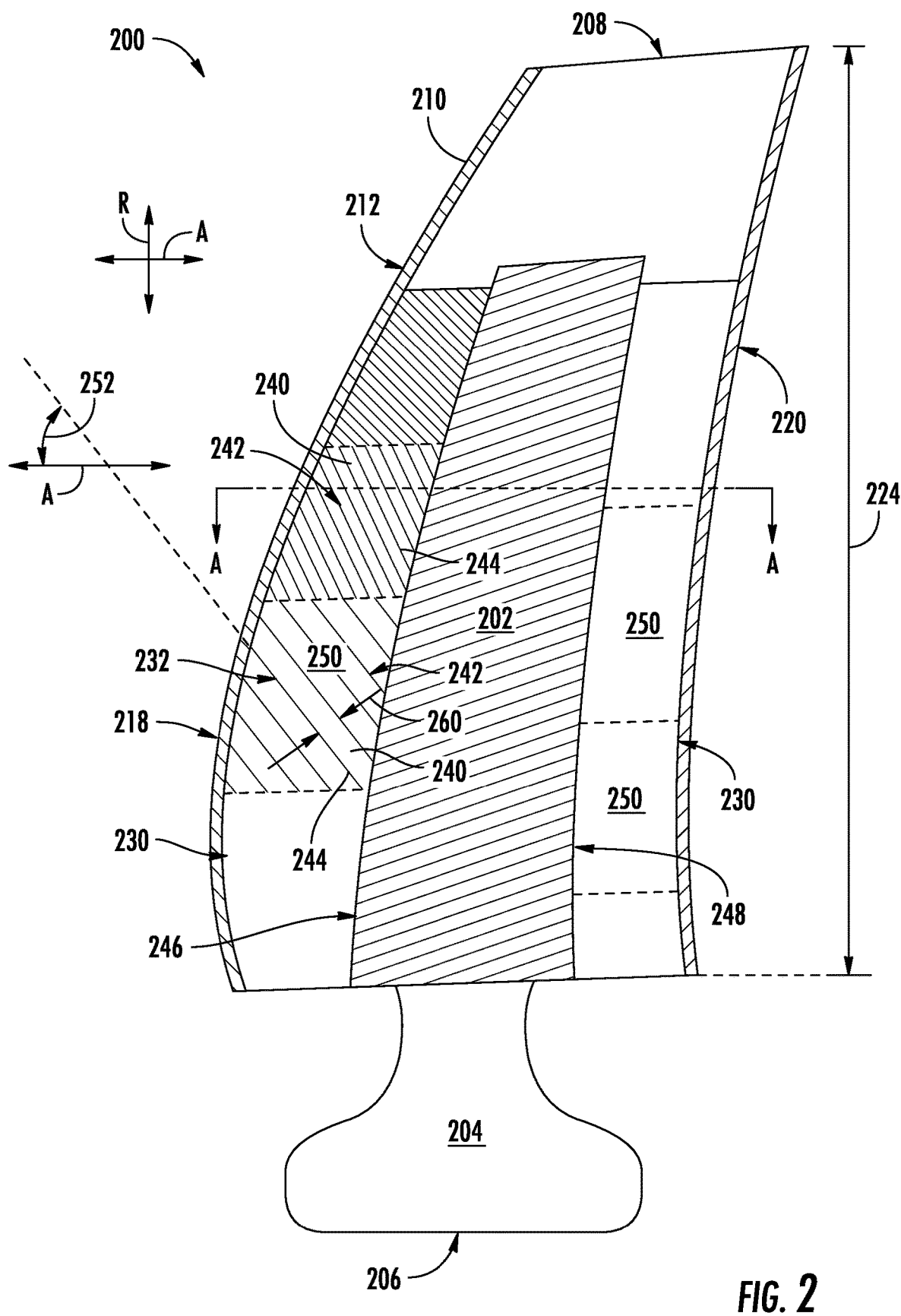
FIG. 2 is a schematic cross-sectional view of an airfoil assembly that may be used with the exemplary gas turbine engine of FIG. 1 in accordance with an exemplary embodiment of the present disclosure.
Figure 3:
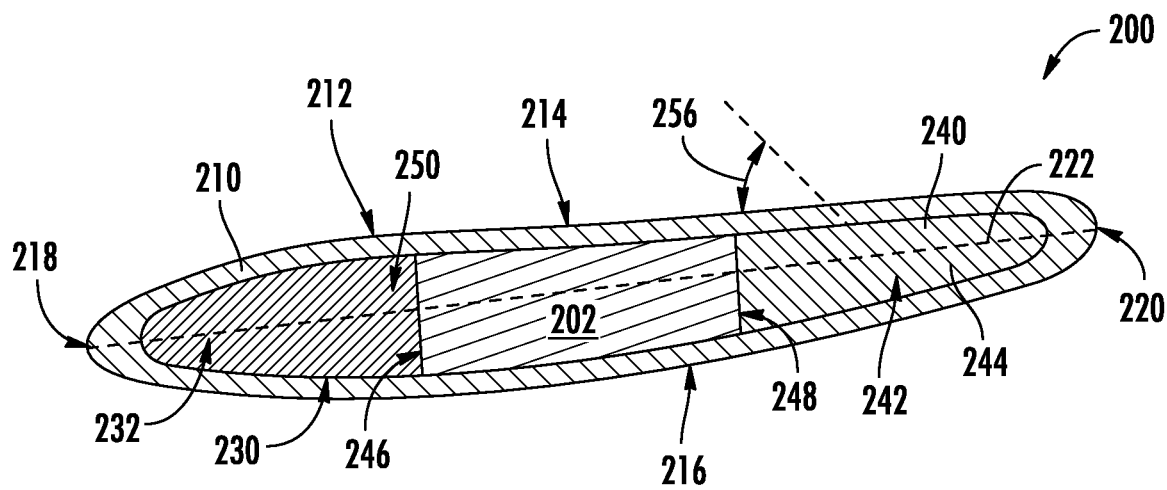
FIG. 3 is a schematic cross-sectional view of the exemplary airfoil assembly of FIG. 2 taken along Line A-A in accordance with an exemplary embodiment of the present disclosure.
Figure 4:
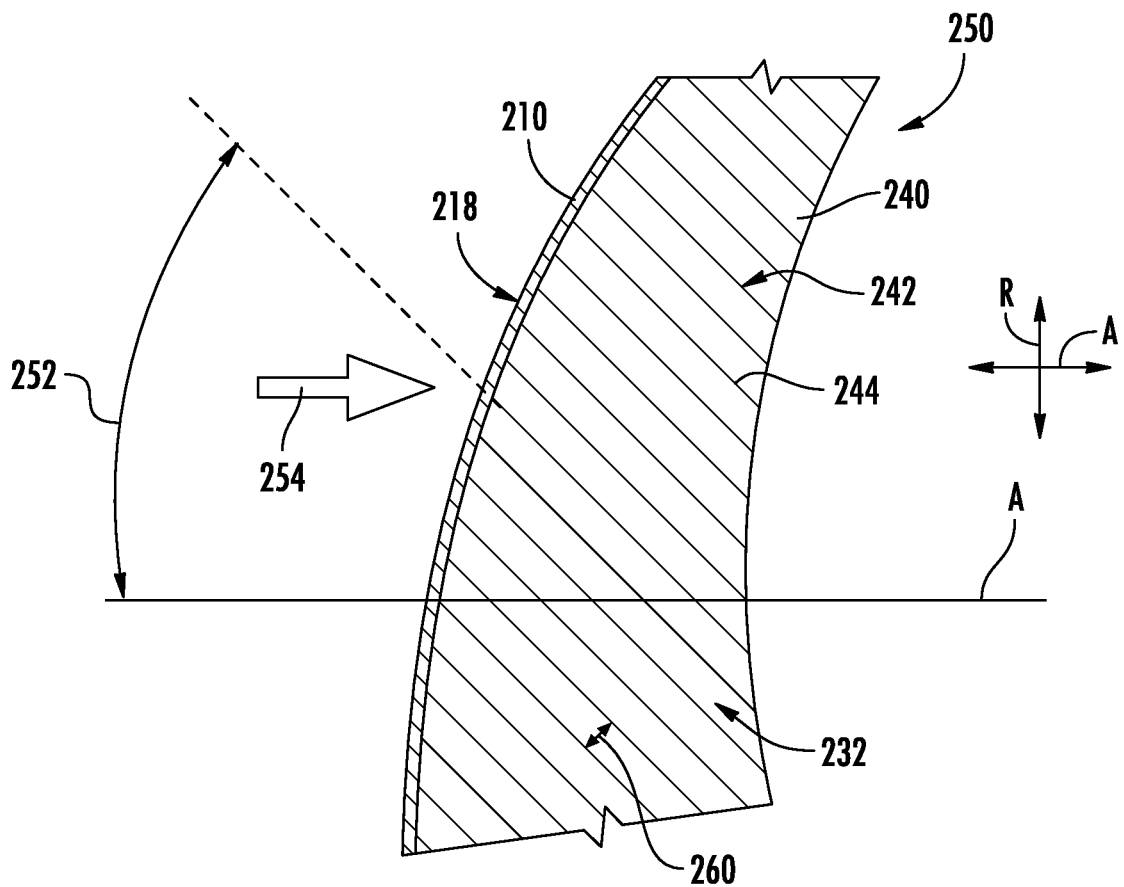
FIG. 4 is a schematic cross-sectional view of an airfoil assembly that may be used with the exemplary gas turbine engine of FIG. 1 in accordance with another exemplary embodiment of the present disclosure.
Figure 5:
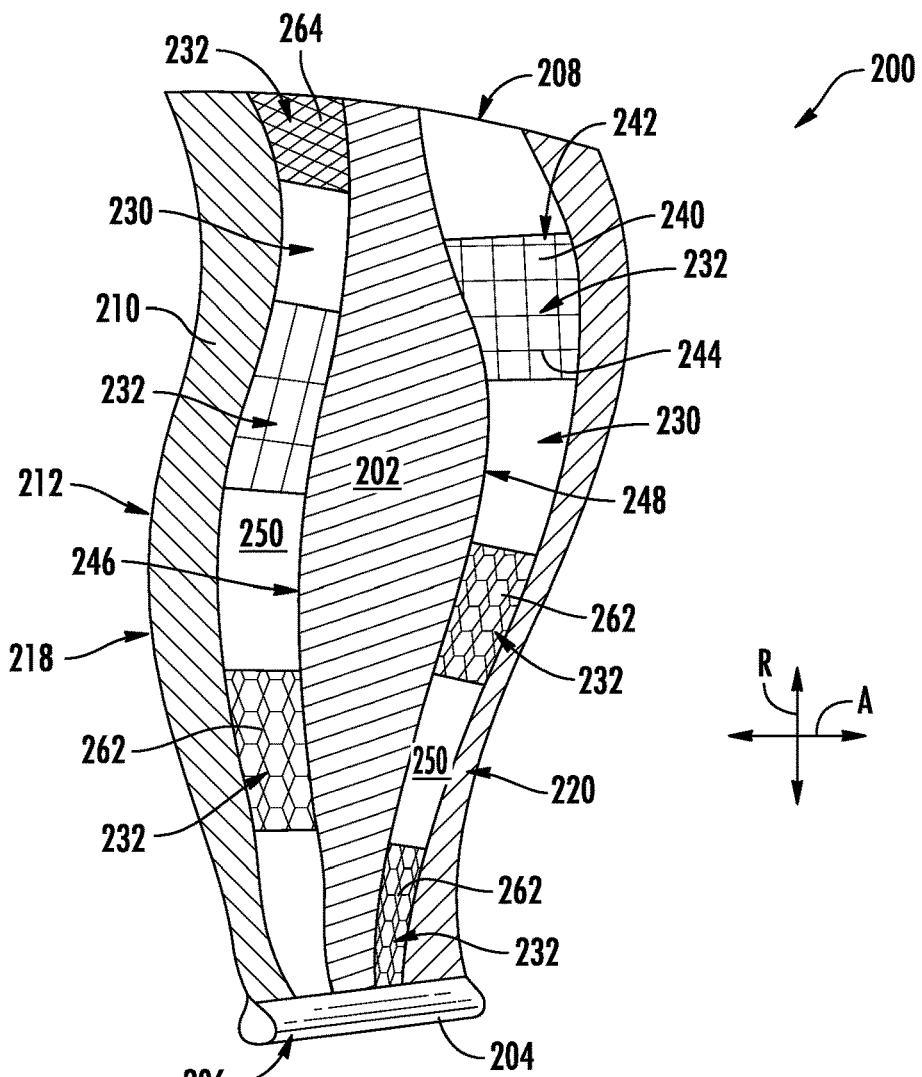
FIG. 5 is a schematic cross-sectional view of an airfoil assembly that may be used with the exemplary gas turbine engine of FIG. 1 in accordance with another exemplary embodiment of the present disclosure.
Figure 6:
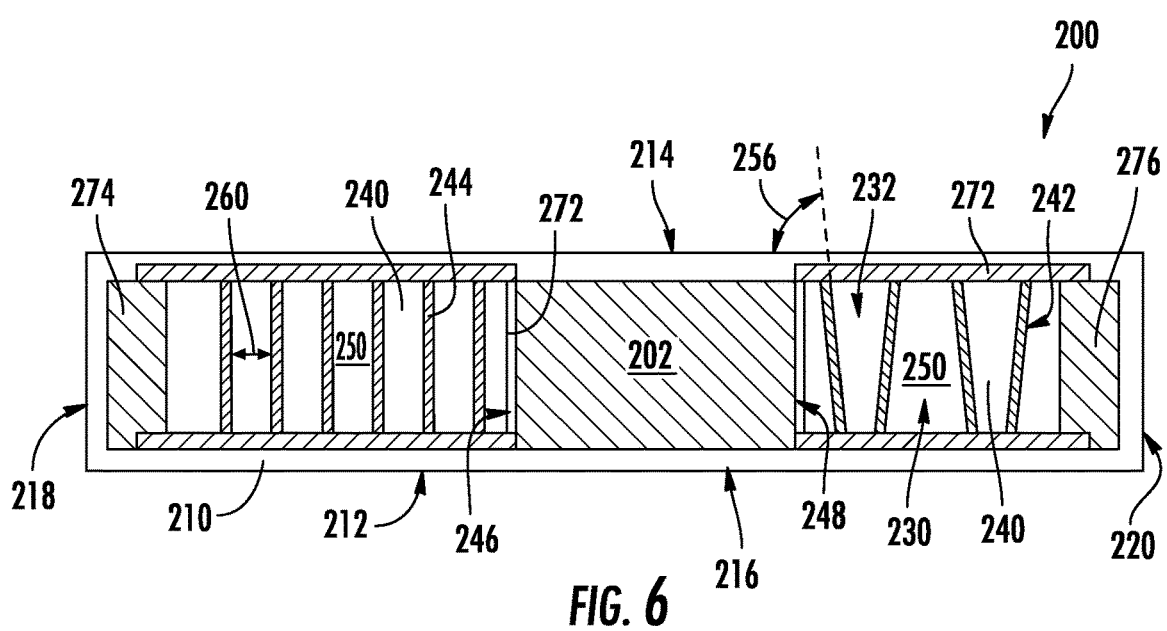
FIG. 6 is a schematic cross-sectional view of an airfoil assembly that may be used with the exemplary gas turbine engine of FIG. 1 in accordance with another exemplary embodiment of the present disclosure.
Figure 7:
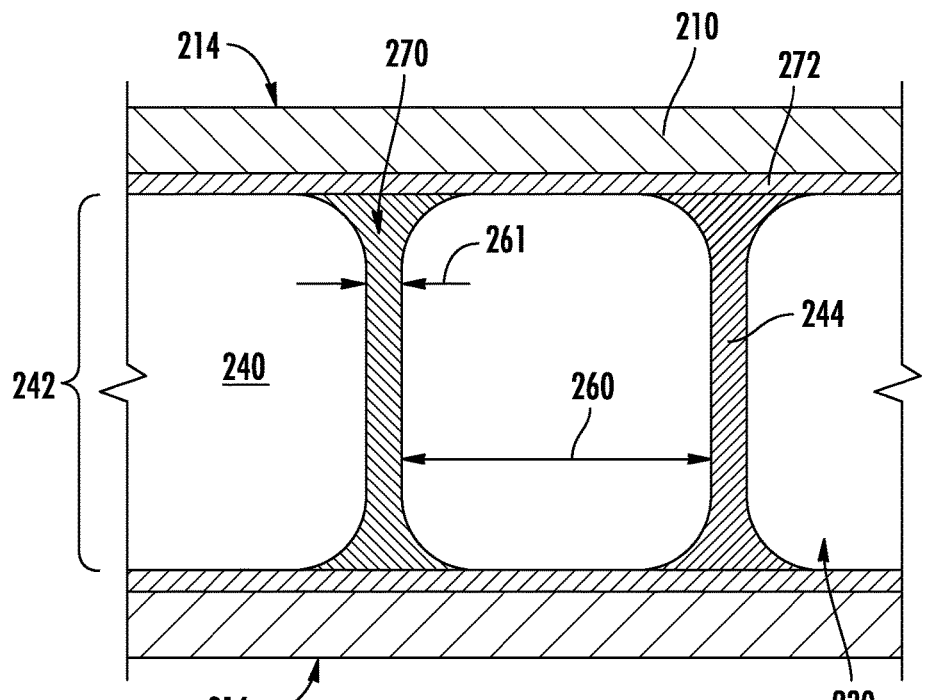
FIG. 7 is a schematic cross-sectional view of an airfoil assembly that may be used with the exemplary gas turbine engine of FIG. 1 in accordance with another exemplary embodiment of the present disclosure.
Figure 8:
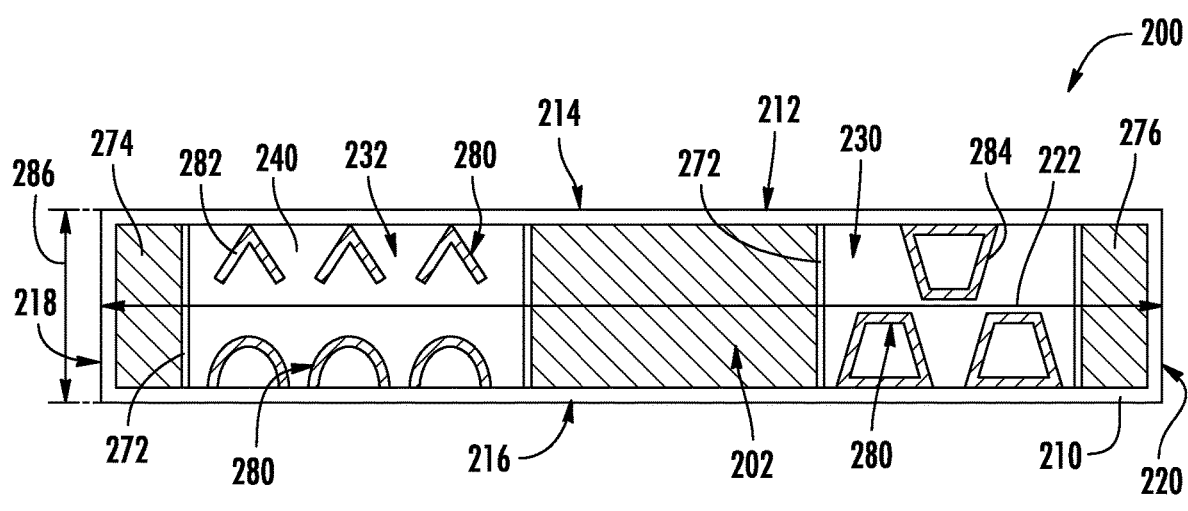
FIG. 8 is a schematic cross-sectional view of an airfoil assembly that may be used with the exemplary gas turbine engine of FIG. 1 in accordance with another exemplary embodiment of the present disclosure.

Referring now generally to FIGS. 2 through 8, airfoil assemblies that may be used in a gas turbine engine will be described according to exemplary embodiments of the present subject matter. Specifically, FIGS. 2 through 4 provide schematic illustrations of an airfoil assembly 200 that may be used in gas turbine engine 100, e.g., as fan blade 154 or as fan guide vanes 162. In addition, FIG. 5 provides another exemplary configuration of an airfoil assembly 200, e.g., similar to that which may be used in a ducted turbofan engine. FIGS. 6 through 8 provide exemplary schematic cross-sections of airfoil assemblies in accordance with exemplary embodiments of the present subject matter.

Notably, due to the similarity between embodiments described herein, like reference numerals may be used to refer to the same or similar features among various embodiments. Although airfoil assemblies 200 are described herein as being used with gas turbine engine 100, it should be appreciated that aspects of the present subject matter may be applicable to any suitable blades for any suitable gas turbine engine. Indeed, the exemplary blade constructions and features described herein may be interchangeable among embodiments to generate additional exemplary embodiments. The specific structures illustrated and described herein are only exemplary and are not intended to limit the scope of the present subject matter in any manner.

Referring now specifically to FIG. 2, airfoil assembly 200 may generally include a central spar 202 that extends outward along a radial direction R, e.g., which corresponds to radial direction R when airfoil assembly 200 is installed in gas turbine engine 100. More specifically, as illustrated, central spar 202 may include a blade attachment structure 204, e.g., illustrated as a dovetail, for securing airfoil assembly 200 to a rotating central hub (e.g., or mechanically coupling airfoil assemblies 200 to actuators 158). Central spar 202 may generally define a root 206 of airfoil assembly 200 and may extend outward from root 206 along the radial direction R toward a tip 208 of airfoil assembly 200. In general, central spar 202 may be formed from any suitably rigid material(s) that can withstand the forces exerted on airfoil assembly 200 during operation of the gas turbine engine 100.

In addition, airfoil assembly 200 includes a blade skin 210 that is generally positioned or wrapped around central spar 202 to define an airfoil 212. Blade skin 210 may be a polymer matrix composite (PMC), epoxy resin, carbon fiber, glass fiber, thermoplastics material, etc. As used herein, the terms "airfoil" and the like may generally refer to the shape or geometry of an outer surface of airfoil assembly 200, e.g., the surface that interacts with the stream of air passing over airfoil assembly 200. In general, airfoil 212 has a pressure side 214 and a suction side 216 extending in the axial direction A between a leading edge 218 (e.g., a forward end of airfoil 212) and a trailing edge 220 (e.g., an aft end of airfoil 212). In addition, a chord line 222 may be generally defined as a line extending between leading edge 218 and trailing edge 220, and the term "chordwise direction" may generally refer to the relative position along chord line 222. In addition, a span 224 of airfoil assembly 200 may be generally defined as the distance between root 206 and tip 208 of airfoil assembly 200 as measured along the radial direction R, and the term "spanwise direction" may generally refer to relative position along span 224.

As illustrated, at least one cavity 230 may be defined between blade skin 210 and central spar 202. Airfoil assembly 200 may further include a support structure 232 that is positioned at least partially within the cavities 230, e.g., to provide additional structural support and rigidity to airfoil assembly 200 without unnecessarily increasing a weight of airfoil assembly 200. Notably, as explained above, filling cavities within an airfoil with only foam may provide a lightweight solution for improving the rigidity of the airfoil. However, foam filler often suffers from deformation, damage, or debonding during blade impact events, such as ice ingestion or bird strike. Accordingly, aspects of the present subject matter are directed toward an improved support structure 232 that is lightweight, provides improved structural rigidity to airfoil assembly 200, and can withstand the forces associated high operational loads or ingestion events.

Specifically, referring again to the figures, support structure 232 may generally include a foam 240 and a foam reinforcement structure 242 that is embedded within foam 240. In general, the foam reinforcement structure 242 may be any suitable number, size, geometry, and position of support members positioned within cavities 230 for providing improved rigidity to foam 240, support structure 232, and airfoil assembly 200. Although exemplary foam reinforcement structures 242 are described herein according to exemplary embodiments of the present subject matter, it should be appreciated that these are examples and are not intended to limit the scope of the present subject matter in any manner.

According to exemplary embodiments, foam 240 may generally include at least one of polymethacrylimide (PMI) foam or a urethane foam. In addition, or alternatively, foam 240 may also include cast syntactic or expanding syntactic foams, e.g., glass, carbon, or phenolic micro balloons cast in resin. Other suitable foams are possible and within the scope of the present subject matter. Foam reinforcement structure 242 may generally be formed from any material suitable for improving the rigidity or durability of support structure 232. For example, according to exemplary embodiments, foam reinforcement structure 242 may include at least one of a polymer matrix composite material (PMC), metallic reinforcements, carbon reinforcements, thermoplastics, or glass. In addition, as described in more detail below, foam reinforcement structure 242 may have a variety of geometries, such as the linear support members, honeycomb structures, cellular matrix structures, etc.

Foam reinforcement structure 242 may include any of the aforementioned materials in a unidirectional pre-preg, braided, and/or woven construction. By way of example, according to one embodiment, the PMC material is defined in part by prepreg, which is a reinforcement material pre-impregnated with a matrix material, such as thermoplastic resin desired for the matrix material. Non-limiting examples of processes for producing thermoplastic prepregs include hot melt pre-pregging in which the fiber reinforcement material is drawn through the molten bath of resin and powder pre-pregging in which a resin is deposited onto the fiber reinforcement material (for example electrostatically) and then adhered to the fiber (for example, in an oven or with the assistance of heated rollers). The prepregs can be in the form of unidirectional tapes or woven fabrics, which are then stacked on top of one another to create the number of stacked plies desired for the part.

According to an alternative option, instead of using a prepreg, with the use of thermoplastic polymers it is possible to have a woven fabric as the foam reinforcement structure 242 that has, for example, dry carbon fiber woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fiber, carbon fiber, and thermoplastic fiber could all be woven together in various concentrations to tailor the properties of the part. The carbon fiber provides the strength of the system, the glass may be incorporated to enhance the impact properties, which is a design characteristic for parts located near the inlet of the engine, and the thermoplastic fibers are the matrix that will be flowed to bind the reinforcement fibers.

Many PMC materials are fabricated with the use of prepreg, which is a fabric or unidirectional tape that is impregnated with resin. Multiple layers of prepreg may be layered as needed to form the desired geometry for the part, e.g., one of the structural support members 244 or the foam reinforcement structure 242, and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

According to the exemplary embodiment illustrated in FIGS. 2 through 4, foam reinforcement structure 242 may include a plurality of structural support members 244 that extend through foam 240 and which have any suitable geometry, angle, and spacing for improving the rigidity are structural integrity of airfoil assembly 200. According to the illustrated embodiment, each of the plurality of structural support members 244 is substantially straight or planar and extends between leading edge 218 of airfoil 212 to an upstream edge 246 of central spar 202. However, it should be appreciated that according to alternative embodiments, structural support members 244 may be positioned elsewhere within airfoil assembly 200. For example, structural support members 244 may additionally or alternatively extend between a downstream edge 248 of central spar 202 and trailing edge 220 of airfoil 212.

Referring still to FIG. 2, cavity 230 may generally define a plurality of regions (e.g., identified herein generally by reference numeral 250). It should be appreciated that the design of foam reinforcement structure 242 may vary from one region 250 to another, e.g., based on the anticipated forces experienced at those particular regions 250. For example, the foam reinforcement structure 242 may vary in geometry, may be constructed of a different material, may have a different thickness or orientation, etc., depending on the location within airfoil assembly 200.

For example, FIG. 2 illustrates airfoil assembly 200 with three regions 250 of foam reinforcement structure 242 (e.g., with other regions being omitted for clarity). According to the illustrated embodiment, each of the plurality of structural support members 244 may extend at a first angle 252 measured relative to the axial direction A. In this regard, as shown schematically in FIG. 4, ingested objects (e.g., as identified by arrow 254) are commonly moving along the axial direction A relative to airfoil assembly 200, e.g., due to the air speed of gas turbine engine 100 upon ingestion. Notably, due to the rotational speed of airfoil 212, the shape of airfoil 212, and other factors, the forces exerted on airfoil assembly 200 may be known for each region 250 of airfoil assembly 200. First angle 252 may be tailored at a specific position within airfoil assembly 200 for absorbing the most commonly experienced forces at that location.

According to exemplary embodiments of the present subject matter, first angle 252 may be 0° (e.g., parallel to the axial direction A), may be normal to leading edge 218 of airfoil 212, or may be any other suitable angle. Specifically, according to the illustrated embodiment, first angle 252 may be between about 20° and 80°, between about 30° and 65°, between about 40° and 55°, or about 50°. In addition, although first angle 252 is illustrated as being substantially constant within each region 250, it should be appreciated that first angle 252 may vary for each structural support member 244 (e.g., within each region 250) while remaining within the scope of the present subject matter. In addition, it should be appreciated that according to alternative embodiments structural support members 244 may be non-parallel within a given region 250, may have different cross-sectional profiles, etc.

Referring now specifically to FIG. 3, structural support members 244 may additionally or alternatively extend between pressure side 214 and suction side 216 of airfoil 212. As illustrated, these structural support members 244 may define a second angle 256 is measured relative to pressure side 214 of airfoil 212. According to an exemplary embodiment of the present subject matter (e.g., as illustrated for example in FIG. 6), structural support member 244 may extend substantially normal to pressure side 214, such that second angle 256 is substantially 90°. By contrast, according to alternative embodiments, structural support members 244 may extend at any other suitable second angle 256, such as between about between about 20° and 90°, between about 50° and 85°, between about 70° and 80°, or about 75°. Other suitable second angles 256 may be used, e.g., depending on the anticipated forces that will be exerted on the pressure side 214 and suction side 216, respectively.

As illustrated in the figures, foam reinforcement structure 242 may generally define a spacing 260 between adjacent structural support members 244. In this regard, spacing 260 may be measured as the distance between adjacent structural support members 244 in a direction normal to such structural support members 244. In general, spacing 260 may vary depending on the structural loading expected at a particular location on airfoil assembly 200, e.g., with smaller spacing generally supporting higher loads. According to exemplary embodiments, spacing 260 within a particular region 250 may be between 0.1 and 6 inches, between 0.3 and 4 inches, between 0.5 and 2 inches, or about 1 inch. In addition, each of the plurality of structural support members 244 may define a structure thickness 261 (see FIG. 7). According to exemplary embodiments, structure thickness 261 is between 0.002 and 0.05 inches, between 0.003 and 0.04 inches, between 0.006 and 0.02 inches, or about 0.013 inches. Other spacings and structure sizes are possible and within the scope present subject matter.

Notably, it should be appreciated that foam reinforcement structure 242 may have any suitable geometry or structure. For example, as described above, foam reinforcement structure 242 includes a plurality of linear structural support members 244. However, it should be appreciated that structural support members 244 may be curved, serpentine, or may have any other suitable size and/or geometry depending on the application. Moreover, referring now briefly to FIG. 5, foam reinforcement structure 242 may further include a honeycomb structure (e.g., as identified generally by reference numeral 262), a cellular matrix structure (e.g., as identified generally by reference numeral 264), or any other suitable grid, lattice, or mesh-like structure. In addition, the specific geometry selected for foam reinforcement structure 242 may vary depending on the location within airfoil assembly 200.

According to exemplary embodiments, each region 250 of airfoil 212 may include a foam reinforcement structure 242 that is similar to or different that other regions 250 of the same airfoil 212. For example, one region 250 may include structural support members 244, another may include a honeycomb structure 262, and still another may include a cellular matrix. In addition, the spacing 260 and structure thickness 261 may vary among regions 250. Indeed, it should be appreciated that any and all of the foam reinforcement structures 242 and their variations described herein may not be mutually exclusive and may be utilized in a single airfoil as desired depending on the application.

Referring now briefly to FIG. 7, according to an exemplary embodiment of the present subject matter, structural support members 244 may include a flared end 270 that contacts blade skin 210. In this regard, a thickness of each structural support member 244 may increase toward a contact point with blade skin 210 to provide improved physical connection or load distribution between the blade skin 210 and structural support member 244. Other geometry variations are possible and within the scope of the present subject matter.

In addition, airfoil assembly 200 may include an adhesive 272 that is positioned on the inside of blade skin 210 and/or on central spar 202 for improving the structural engagement between portions of airfoil assembly 200. In this regard, adhesive 272 may be positioned between support structure 232 and at least one of central spar 202 or blade skin 210. Adhesives may include epoxy, polyurethane, or any other kind of adhesive known to those of ordinary skill in the art.

In addition, airfoil assembly 200 may include additional structural supports for improving the rigidity of airfoil assembly 200. For example, airfoil assembly 200 may include a leading edge structural support 274 and a trailing edge structural support 276. For example, as illustrated in FIG. 6, leading edge structural support 274 may be positioned between blade skin 210 and support structure 232 proximate leading edge 218 of airfoil 212. In addition, or alternatively, trailing edge structural support 276 may be positioned between blade skin 210 and support structure 232 proximate trailing edge 220 of airfoil 212. Each of the leading edge structural support 274 and trailing edge structural support 276 may be spaced apart from central spar 202 along a chordwise direction to define a plurality of cavities 230 filled with support structure 232. In addition, leading edge structural support 274 and trailing edge structural support 276 may be separate from central spar 202 or may be mechanically coupled to central spar 202, e.g., proximate root 206 of airfoil 212.

Referring now briefly to FIG. 8, according to exemplary embodiments of the present subject matter, foam reinforcement structure 242 may further include one or more foam engagement structures 280 that are positioned on or extend from blade skin 210 and into cavities 230 when blade skin 210 is wrapped around central spar 202 and support structure 232. For example, according to the illustrated embodiment, foam engagement structures 280 may include one or more protruding members 282 or tapered lugs 284. As illustrated, airfoil 212 may generally define a blade thickness 286 measured normal to a chordwise direction. According to the illustrated embodiment, foam engagement structures 280 extend across only a portion of blade thickness 286. For example, foam engagement structures 280 may extend less than half, less than a quarter, or less, through blade thickness 286.

Figure 9:
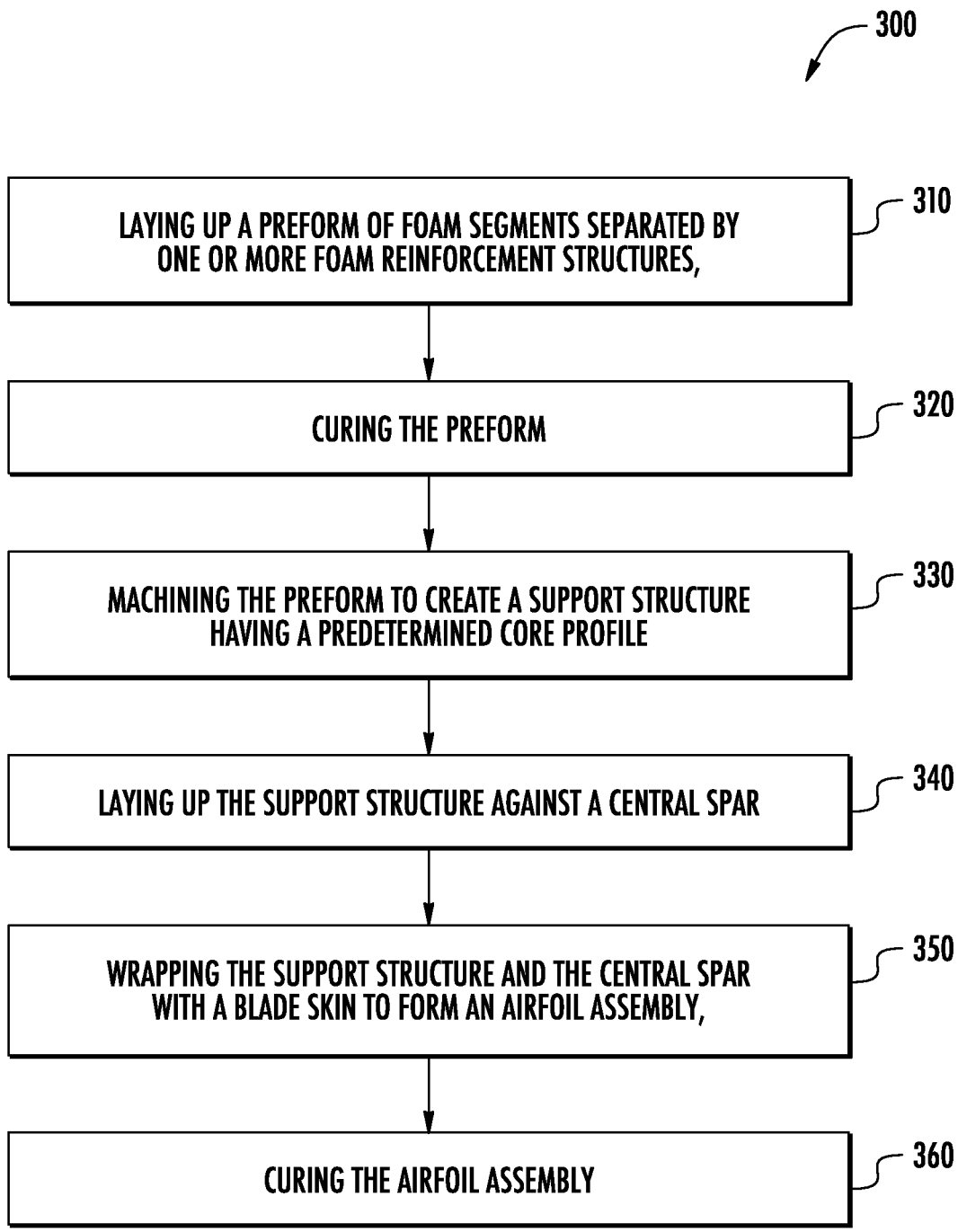
FIG. 9 provides a flowchart diagram of an exemplary method of manufacturing an airfoil assembly in accordance with an exemplary embodiment of the present disclosure.

Referring now to FIG. 9, an exemplary method 300 for constructing an airfoil assembly will be described according to exemplary embodiments of the present subject matter. For example, method 300 may be used to construct airfoil assembly 200 as described above. However, it should be appreciated that aspects of method 300 may be applied to the construction of any other suitable airfoil. In addition, it should be appreciated that alterations and modifications may be made to method 300 while remaining within scope of the present subject matter.

Method 300 may include, at step 310, laying of a preform of foam segments separated by one or more foam reinforcement structures. In this regard, for example, a plurality of solid foam blocks may be formed which have the desired dimensions, e.g., such as a rectangular cross-section with a thickness equivalent to a target spacing between adjacent reinforcement structures. The foam reinforcement structures may be separately manufactured or acquired for providing additional structure support within the foam blocks. Specifically, the foam segments may be alternately stacked with the foam reinforcement structure to create a preform.

According to exemplary embodiments, an adhesive or bonding agent may be applied to one or both the foam segments and the foam reinforcement structures for improved engagement between the two. The adhesive may then be allowed to dry to generate the support structure preform. In addition, or alternatively, step 320 may include curing the preform to cure the adhesive, improve the bond between the foam segments and the foam reinforcement structure, and create a solid support structure that includes both foam segments and foam reinforcement structures.

Notably, steps 310 and 320 may result in a support structure preform that does not have a suitable shape to be the base of an airfoil. Accordingly, if the preform does not have the desired airfoil shape, it may be desirable to machine or manipulate the preform to have a profile suitable for forming an airfoil, e.g., upon assembly and skin wrapping. Accordingly, step 330 may include machining the preform to create a support structure having a predetermined core profile. In this regard, for example, the resulting support structure may have the shape of the cavities defined between a central spar and blade skin.

Step 340 may include laying up the support structure against a central spar. According to exemplary embodiments, an adhesive or bonding agent may be applied between the support structure and the central spar to create the internal structure of airfoil assembly. Step 350 may include wrapping the support structure and the central spar with a blade skin to form an airfoil assembly. Once again, an adhesive may be used on the surface of the blade skin that contacts the support structure and/or the central spar. Step 360 may then include curing the airfoil assembly to bond all components of airfoil assembly together.

According to alternative embodiments of the present subject matter, airfoil assemblies may be constructed by assembling the central spar, blade skin, and support structures prior to injecting a foam filler. In addition, it should be appreciated that the support structure and other portions of airfoil assemblies may be constructed in any suitable manner, e.g., such as via additive manufacturing or other methods. Other suitable methods for manufacturing airfoil assemblies as described herein are possible and within scope of the present subject matter.

FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using airfoil assembly 200 as an example, it should be appreciated that this method may be applied to the construction of any other suitable airfoil for any other suitable application.

Further aspects are provided by the subject matter of the following clauses:

An airfoil assembly comprising: a central spar extending along a first direction; a blade skin positioned around the central spar to define an airfoil that has a pressure side and a suction side extending in a second direction, the second direction being perpendicular to the first direction, between a leading edge and a trailing edge, wherein at least one cavity is defined between the blade skin and the central spar; and a support structure positioned at least partially within the at least one cavity, the support structure comprising: a foam; and a foam reinforcement structure embedded within the foam.

The airfoil assembly of any preceding clause, wherein the foam reinforcement structure comprises a plurality of structural support members, and wherein at least one of the plurality of structural support members extends between the leading edge of the airfoil and an upstream edge of the central spar or between a downstream edge of the central spar and the trailing edge of the airfoil.

The airfoil assembly of any preceding clause, wherein the at least one of the plurality of structural support members extends at a first angle measured relative to the second direction, wherein the first angle is between 30 and 65 degrees.

The airfoil assembly of any preceding clause, wherein the foam reinforcement structure comprises a plurality of structural support members, and wherein at least one of the plurality of structural support members extends between the pressure side and the suction side of the airfoil.

The airfoil assembly of any preceding clause, wherein the at least one of the plurality of structural support members extends at a second angle measured relative to the pressure side of the airfoil, wherein second angle is 90 degrees.

The airfoil assembly of any preceding clause, wherein the at least one of the plurality of structural support members extends at a second angle measured relative to the pressure side of the airfoil, wherein the second angle is greater than 75 degrees and less than 90 degrees.

The airfoil assembly of any preceding clause, wherein the foam reinforcement structure comprises a plurality of structural support members, and wherein the airfoil assembly extends along the first direction between a root and a tip to define a spanwise direction, and wherein a spacing between the plurality of structural support members varies along spanwise direction.

The airfoil assembly of any preceding clause, wherein the spacing between the plurality of structural support members is between 0.5 and 2 inches.

The airfoil assembly of any preceding clause, wherein the each of the plurality of structural support members defines a structure thickness, and wherein the structure thickness is between 0.006 and 0.02 inches.

The airfoil assembly of any preceding clause, wherein the foam reinforcement structure comprises a plurality of structural support members, and wherein at least one of the plurality of structural support members comprises a flared end that contacts the blade skin.

The airfoil assembly of any preceding clause, wherein the foam reinforcement structure comprises a honeycomb or cellular matrix structure.

The airfoil assembly of any preceding clause, wherein the support structure defines a plurality of regions, wherein the foam reinforcement structure is different in geometry or material in at least two of the plurality of regions.

The airfoil assembly of any preceding clause, wherein the foam reinforcement structure further comprises: one or more foam engagement structures positioned on the blade skin and extending into the at least one cavity when the blade skin is positioned around the central spar.

The airfoil assembly of any preceding clause, wherein the one or more foam engagement structures comprise one or more tapered lugs.

The airfoil assembly of any preceding clause, wherein the airfoil defines a blade thickness measured normal to a chordwise direction defined between the leading edge and the trailing edge of the airfoil, and wherein the one or more tapered lugs extend across only a portion of the blade thickness.

The airfoil assembly of any preceding clause, further comprising: a leading edge structural support and a trailing edge structural support, each of the leading edge structural support and the trailing edge structural support being spaced apart from the central spar along a chordwise direction to define a plurality of cavities filled with the support structure.

The airfoil assembly of any preceding clause, wherein the foam comprises at least one of a polymethacrylimide (PMI) foam, a urethane foam, or a cast syntactic foam.

The airfoil assembly of any preceding clause, wherein the foam reinforcement structure comprises at least one of a polymer matrix composite material, metallic reinforcements, carbon reinforcements, thermoplastics, or glass.

The airfoil assembly of any preceding clause, further comprising: an adhesive positioned between support structure and at least one of the central spar or the blade skin.

A method of manufacturing an airfoil assembly, the method comprising: laying up a preform of foam segments separated by one or more foam reinforcement structures; machining the preform to create a support structure having a predetermined core profile; laying up the support structure against a central spar; positioning a blade skin around the support structure and the central spar to form the airfoil assembly; and curing the airfoil assembly.

The method of any preceding clause, wherein the airfoil assembly comprises: a central spar extending along a first direction; a blade skin positioned around the central spar to define an airfoil that has a pressure side and a suction side extending in a second direction, the second direction being perpendicular to the first direction, between a leading edge and a trailing edge, wherein at least one cavity is defined between the blade skin and the central spar; and a support structure positioned at least partially within the at least one cavity, the support structure comprising: a foam; and a foam reinforcement structure embedded within the foam.

The method of any preceding clause, wherein the foam reinforcement structure comprises a plurality of structural support members, and wherein at least one of the plurality of structural support members extends between the leading edge of the airfoil and an upstream edge of the central spar or between a downstream edge of the central spar and the trailing edge of the airfoil.

The method of any preceding clause, wherein the at least one of the plurality of structural support members extends at a first angle measured relative to the second direction, wherein the first angle is between 30 and 65 degrees.

The method of any preceding clause, wherein the foam reinforcement structure comprises a plurality of structural support members, and wherein at least one of the plurality of structural support members extends between the pressure side and the suction side of the airfoil.

The method of any preceding clause, wherein the at least one of the plurality of structural support members extends at a second angle measured relative to the pressure side of the airfoil, wherein second angle is 90 degrees.

The method of any preceding clause, wherein the at least one of the plurality of structural support members extends at a second angle measured relative to the pressure side of the airfoil, wherein the second angle is greater than 75 degrees and less than 90 degrees.

The method of any preceding clause, wherein the foam reinforcement structure comprises a plurality of structural support members, and wherein the airfoil assembly extends along the first direction between a root and a tip to define a spanwise direction, and wherein a spacing between the plurality of structural support members varies along spanwise direction.

The method of any preceding clause, wherein the spacing between the plurality of structural support members is between 0.5 and 2 inches.

The method of any preceding clause, wherein the each of the plurality of structural support members defines a structure thickness, and wherein the structure thickness is between 0.006 and 0.02 inches.

The method of any preceding clause, wherein the foam reinforcement structure comprises a plurality of structural support members, and wherein at least one of the plurality of structural support members comprises a flared end that contacts the blade skin.

The method of any preceding clause, wherein the foam reinforcement structure comprises a honeycomb or cellular matrix structure.

The method of any preceding clause, wherein the support structure defines a plurality of regions, wherein the foam reinforcement structure is different in geometry or material in at least two of the plurality of regions.

The method of any preceding clause, wherein the foam reinforcement structure further comprises: one or more foam engagement structures positioned on the blade skin and extending into the at least one cavity when the blade skin is positioned around the central spar.

The method of any preceding clause, wherein the one or more foam engagement structures comprise one or more tapered lugs.

The method of any preceding clause, wherein the airfoil defines a blade thickness measured normal to a chordwise direction defined between the leading edge and the trailing edge of the airfoil, and wherein the one or more tapered lugs extend across only a portion of the blade thickness.

The method of any preceding clause, further comprising: a leading edge structural support and a trailing edge structural support, each of the leading edge structural support and the trailing edge structural support being spaced apart from the central spar along a chordwise direction to define a plurality of cavities filled with the support structure.

The method of any preceding clause, wherein the foam comprises at least one of a polymethacrylimide (PMI) foam, a urethane foam, or a cast syntactic foam.

The method of any preceding clause, wherein the foam reinforcement structure comprises at least one of a polymer matrix composite material, metallic reinforcements, carbon reinforcements, thermoplastics, or glass.

The method of any preceding clause, further comprising: an adhesive positioned between support structure and at least one of the central spar or the blade skin.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An airfoil assembly comprising:
 a central spar extending along a first direction;
 a blade skin positioned around the central spar to define an airfoil that has a pressure side and a suction side extending in a second direction, the second direction being perpendicular to the first direction, the pressure side and the suction side between a leading edge and a trailing edge, wherein at least one cavity is defined between the blade skin and the central spar; and
 a support structure positioned at least partially within the at least one cavity and extending between an inner surface of the blade skin to an outer surface of the central spar, the support structure comprising:
- a foam; and
- a foam reinforcement structure embedded within the foam,
  wherein the foam reinforcement structure comprises a plurality of structural support members, and wherein at least one of the plurality of structural support members extends between the leading edge of the airfoil and an upstream edge of the central spar or between a downstream edge of the central spar and the trailing edge of the airfoil.

2. The airfoil assembly of claim 1, wherein the at least one of the plurality of structural support members extends at a first angle measured relative to the second direction, wherein the first angle is between 30 and 65 degrees.

3. The airfoil assembly of claim 1, wherein the at least one of the plurality of structural support members extends between the pressure side and the suction side of the airfoil.

4. The airfoil assembly of claim 3, wherein the at least one of the plurality of structural support members extends at a second angle measured relative to the pressure side of the airfoil, wherein second angle is 90 degrees.

5. The airfoil assembly of claim 3, wherein the at least one of the plurality of structural support members extends at a second angle measured relative to the pressure side of the airfoil, wherein the second angle is greater than 75 degrees and less than 90 degrees.

6. The airfoil assembly of claim 1, wherein the airfoil assembly extends along the first direction between a root and a tip to define a spanwise direction, and wherein a spacing between the plurality of structural support members varies along the spanwise direction.

7. The airfoil assembly of claim 6, wherein the spacing between the plurality of structural support members is between 0.5 and 2 inches.

8. The airfoil assembly of claim 6, wherein each of the plurality of structural support members defines a structure thickness, and wherein the structure thickness is between 0.006 and 0.02 inches.

9. The airfoil assembly of claim 1, wherein the at least one of the plurality of structural support members comprises a flared end that contacts the blade skin.

10. The airfoil assembly of claim 1, wherein the foam reinforcement structure further comprises a honeycomb or cellular matrix structure.

11. The airfoil assembly of claim 1, wherein the support structure defines a plurality of regions, wherein the foam reinforcement structure is different in geometry or material in at least two of the plurality of regions.

12. The airfoil assembly of claim 1, wherein the foam reinforcement structure further comprises:
  one or more foam engagement structures positioned on the blade skin and extending into the at least one cavity when the blade skin is positioned around the central spar.

13. The airfoil assembly of claim 12, wherein the one or more foam engagement structures comprise one or more tapered lugs.

14. The airfoil assembly of claim 13, wherein the airfoil defines a blade thickness measured normal to a chordwise direction defined between the leading edge and the trailing edge of the airfoil, and wherein the one or more tapered lugs extend across only a portion of the blade thickness.

15. The airfoil assembly of claim 1, further comprising:
  a leading edge structural support and a trailing edge structural support, each of the leading edge structural support and the trailing edge structural support being spaced apart from the central spar along a chordwise direction to define a plurality of cavities filled with the support structure.

16. The airfoil assembly of claim 1, wherein the foam comprises at least one of a polymethacrylimide (PMI) foam, a urethane foam, or a cast syntactic foam.

17. The airfoil assembly of claim 1, wherein the foam reinforcement structure comprises at least one of a polymer matrix composite material, metallic reinforcements, carbon reinforcements, thermoplastics, or glass.

18. The airfoil assembly of claim 1, further comprising:
  an adhesive positioned between the support structure and at least one of the central spar or the blade skin.

19. A method of manufacturing the airfoil assembly of claim 1, the method comprising:
  laying up a preform of foam segments separated by one or more foam reinforcement structures;
  machining the preform to create the support structure having a predetermined core profile;
  laying up the support structure against the central spar;
  positioning the blade skin around the support structure and the central spar to form the airfoil assembly, wherein the preform extends between the inner surface of the blade skin to the outer surface of the central spar; and
  curing the airfoil assembly.

* * * * *